March 24, 1942.　　G. JAEGER ET AL　　2,277,517
TRANSMISSION
Filed Oct. 18, 1939　　6 Sheets-Sheet 1

INVENTORS
Gebhard Jaeger.
Chris Gerst.
BY Corbett & Mahoney
ATTORNEYS

March 24, 1942. G. JAEGER ET AL 2,277,517
TRANSMISSION
Filed Oct. 18, 1939 6 Sheets-Sheet 2

INVENTORS
Gebhard Jaeger.
Chris Gerst.
BY Corbett + Mahoney
ATTORNEYS

March 24, 1942.   G. JAEGER ET AL   2,277,517
TRANSMISSION
Filed Oct. 18, 1939   6 Sheets-Sheet 3

INVENTORS
Gebhard Jaeger.
Chris Gerst.
BY Corbett + Mahoney
ATTORNEYS

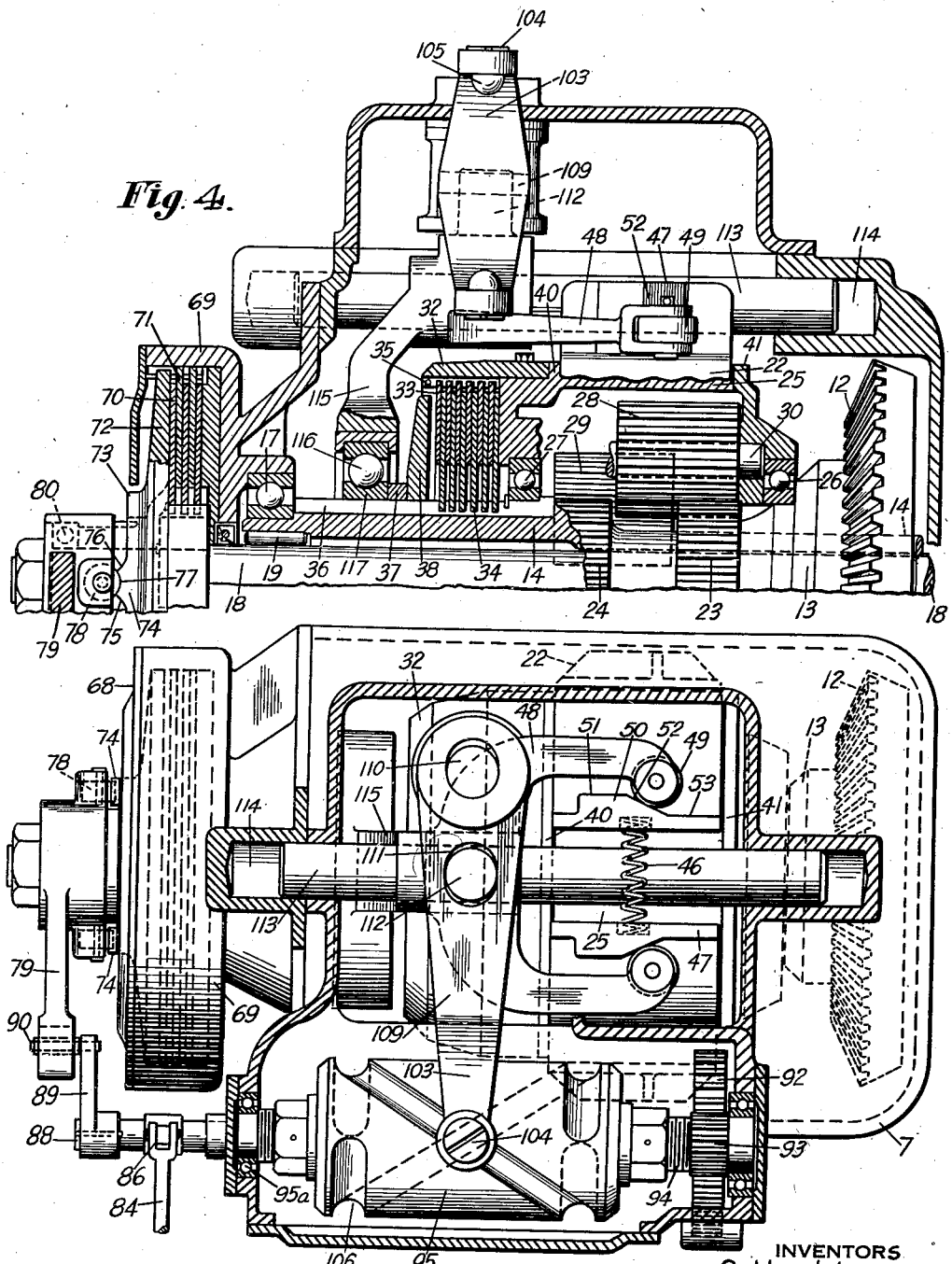

March 24, 1942.　　G. JAEGER ET AL　　2,277,517

TRANSMISSION

Filed Oct. 18, 1939　　6 Sheets-Sheet 5

INVENTORS
Gebhard Jaeger.
Chris Gerst.
BY Corbett + Mahoney
ATTORNEYS

March 24, 1942. G. JAEGER ET AL 2,277,517
TRANSMISSION
Filed Oct. 18, 1939   6 Sheets-Sheet 6

INVENTORS
Gebhard Jaeger.
Chris Gerst.
BY Corbett + Mahoney
ATTORNEYS

Patented Mar. 24, 1942

2,277,517

UNITED STATES PATENT OFFICE 2,277,517

TRANSMISSION

Gebhard Jaeger, Columbus, Ohio, and Chris Gerst, Detroit, Mich., assignors to The Jaeger Machine Company, Columbus, Ohio, a corporation of Ohio Application October 18, 1939, Serial No. 300,024

1 Claim. (Cl. 192—94)

Our invention relates to a transmission control. It has to do, more particularly, with a control for a transmission of a type which may be incorporated in the drive between a power unit and the mixing drum of a concrete mixer, such as a truck mixer, although it is not limited thereto.

It is customary to have on truck mixers a power unit for driving the drum of the mixer. A transmission is usually incorporated in the drive between the power unit and the mixing drum. It is necessary to have a brake associated with the transmission which will serve to prevent rotation of the mixing drum when the drive between the power unit and the drum is disconnected. This brake serves to prevent rotation of the drum during the charging operation or at other selected periods. It is absolutely essential that the brake be effective to prevent rotation of the drum each time that the drive between the power unit and the drum is interrupted in order to prevent injury to workmen during loading, et cetera.

With a transmission of this type, means is usually provided so that the transmission may be selectively actuated to drive the mixing drum in either direction. It is desirable to have a single control lever for actuating this means and for actuating the brake which prevents rotation of the drum. Furthermore, it is desirable that the control means for performing these various functions be of a simple structure and be of such a type that it will not bind even when encountering the unfavorable conditions when it is associated with a mixer and which are caused by water, sand, et cetera.

The object of our invention is to provide controlling means for controlling a transmission of the type indicated which is very simple and composed of a small number of parts, is free of excessive friction to insure ease of operation and is of such a nature that the parts will not bind.

In its preferred form our invention is applied to a transmission which is disposed between a power unit, such as an internal combustion engine, and a member to be driven, such as a mixing drum. The in-put shaft of the transmission is connected to the drive shaft of the engine and the out-put shaft of the transmission is suitably connected to the mixing drum so as to drive said drum. Means is disposed between the in-put shaft and the out-put shaft for connecting or disconnecting the shafts. A main brake unit is associated with the transmission and is adapted to prevent rotation of the out-put shaft whenever the drive between the in-put shaft and the out-put shaft is interrupted. The controlling means for the transmission which we provide is such that by actuating a single lever, the main brake unit and the forward and reversing means for the out-put shaft will be actuated. Thus, by operating a single lever the operator can cause the out-put shaft to be entirely disconnected from the in-put shaft and the brake to be applied or can cause the out-put shaft to be rotated in either direction selected and the brake to be released to permit such rotation.

This application is a continuation in part of our co-pending applications on Transmission, Serial No. 152,934, filed July 10, 1937, now Patent No. 2,180,469, issued Nov. 21, 1939, and Serial No. 174,602, filed November 15, 1937, now Patent No. 2,180,470, issued Nov. 21, 1939.

The preferred embodiment of our invention is illustrated in the accompanying drawings wherein similar characters of reference designate corresponding parts and wherein:

Figure 4 is a vertical section taken substantially at right angles to that of Figure 3 and showing the means for selectively driving the out-put shaft in opposite directions and also showing associated parts.

Figure 5 is a view partly in horizontal section and partly in plan showing the structure illustrated in Figure 3 and also showing a portion of the controlling means.

Figure 1:
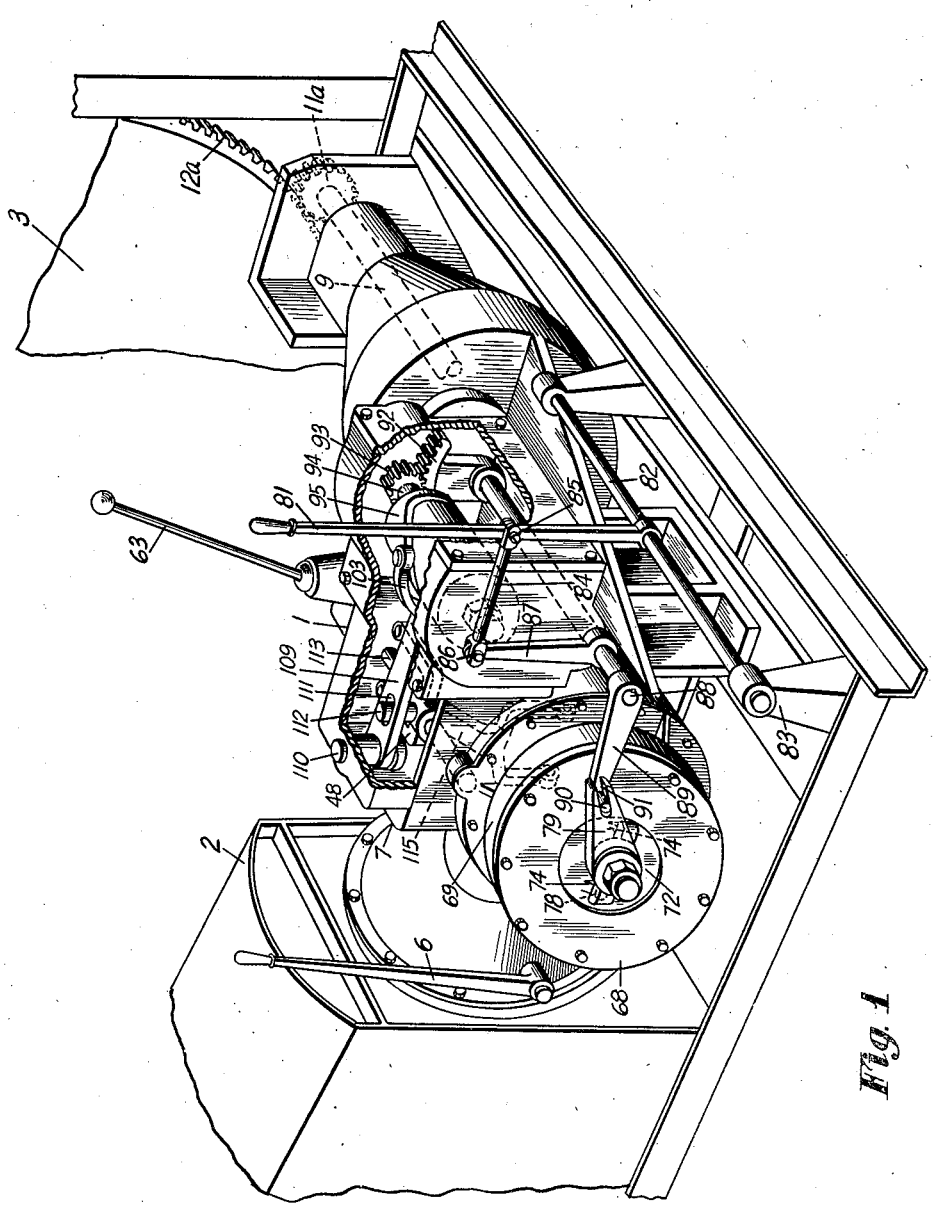
Figure 1 is a perspective view, partly broken away, illustrating a transmission assembly disposed between a power unit and means for rotating a mixing drum with our control applied thereto.

With reference to the drawings and particularly to Figure 1, we have illustrated a transmission 1 to which our control may be applied, disposed between a power unit 2 which may be an internal combustion and a mixing drum illustrated diagrammatically at 3. The transmission 1 in this instance connects the power unit to the means for driving the mixing drum although it is to be understood that it is not limited to this use. The drive shaft of the power unit 2 is adapted to be selectively connected or disconnected to the in-put shaft 4 of the transmission by a clutch (Figure 2) indicated generally by the numeral 5. This clutch may be of any suitable type and does not form a part of this invention. This clutch may be independently controlled by means of a lever 6 which is connected to the clutch in any suitable manner.

The transmission may consist of a suitable housing 7. The in-put shaft 4 passes through an opening in the rear side of the housing (Figure 2) and is mounted for rotation in a ball bearing 8 disposed in this opening. An out-put shaft 9 passes outwardly through an opening formed in the right-hand end of the housing 7. This shaft is rotatably mounted in a ball bearing 10 disposed in such opening. The out-put shaft 9 carries a pinion 11a (Figure 1) which meshes with a bull gear 12a carried by the mixing drum.

Means is provided between the in-put shaft 4 and the output shaft 9 for operatively connecting the shafts together or for disconnecting them. This means when connecting the two shafts will reduce the speed of rotation of the out-put shaft relative to the in-put shaft. Furthermore, this means is of such a nature that the out-put shaft may be driven in a forward or reverse direction. Means may also be provided for changing the speed of rotation of the out-put shaft and for exerting a braking action on such shaft at the proper time.

The in-put shaft 4 will, when the clutch 5 is engaged, be driven continuously by the power unit. On its inner end the shaft 4 has a bevel gear 11 integral therewith. This bevel gear is always in mesh with a ring gear 12. This ring gear 12 includes a sleeve-like portion 13 which is rotatably mounted on a hollow shaft 14 by means of a ball bearing structure 15. The hollow shaft 14 is carried at its right-hand end (Figure 2) by means of a ball bearing 16 suitably supported by the housing 7 and at its opposite end by means of a ball bearing 17 suitably supported by the corresponding end of the housing. A brake shaft 18 extends entirely through the hollow shaft 14 and is rotatable therein. At its left-hand end the hollow shaft 14 is increased in diameter and a roller bearing 19 is disposed therein between the shaft 14 and the shaft 18.

It will be apparent that the ring gear 12 will rotate on the hollow shaft 14 continuously. In order to connect the ring gear 12 to the hollow shaft 14 to rotate it either in a forward or reverse direction, we provide a set of planetary or epicyclic gearing 20 which is under the control of a disk-type friction clutch 21 and a brake member 22. As will be apparent hereinafter, when the disk-type clutch 21 is disengaged and the brake 22 is disengaged, the planetary gearing will be inoperative to rotate the hollow shaft 14. With the clutch 21 in engagement and the brake 22 released, the shaft 14 will be driven by the planetary gearing in a forward direction. However, with the clutch 21 released and the brake 22 applied, the planetary gearing will serve to drive the shaft 14 in a reverse direction. Furthermore, as will be apparent hereinafter, suitable means is provided for simultaneously applying the clutch 21 and releasing the brake 22 and vice versa, or for releasing both the clutch and the brake.

Figure 2:
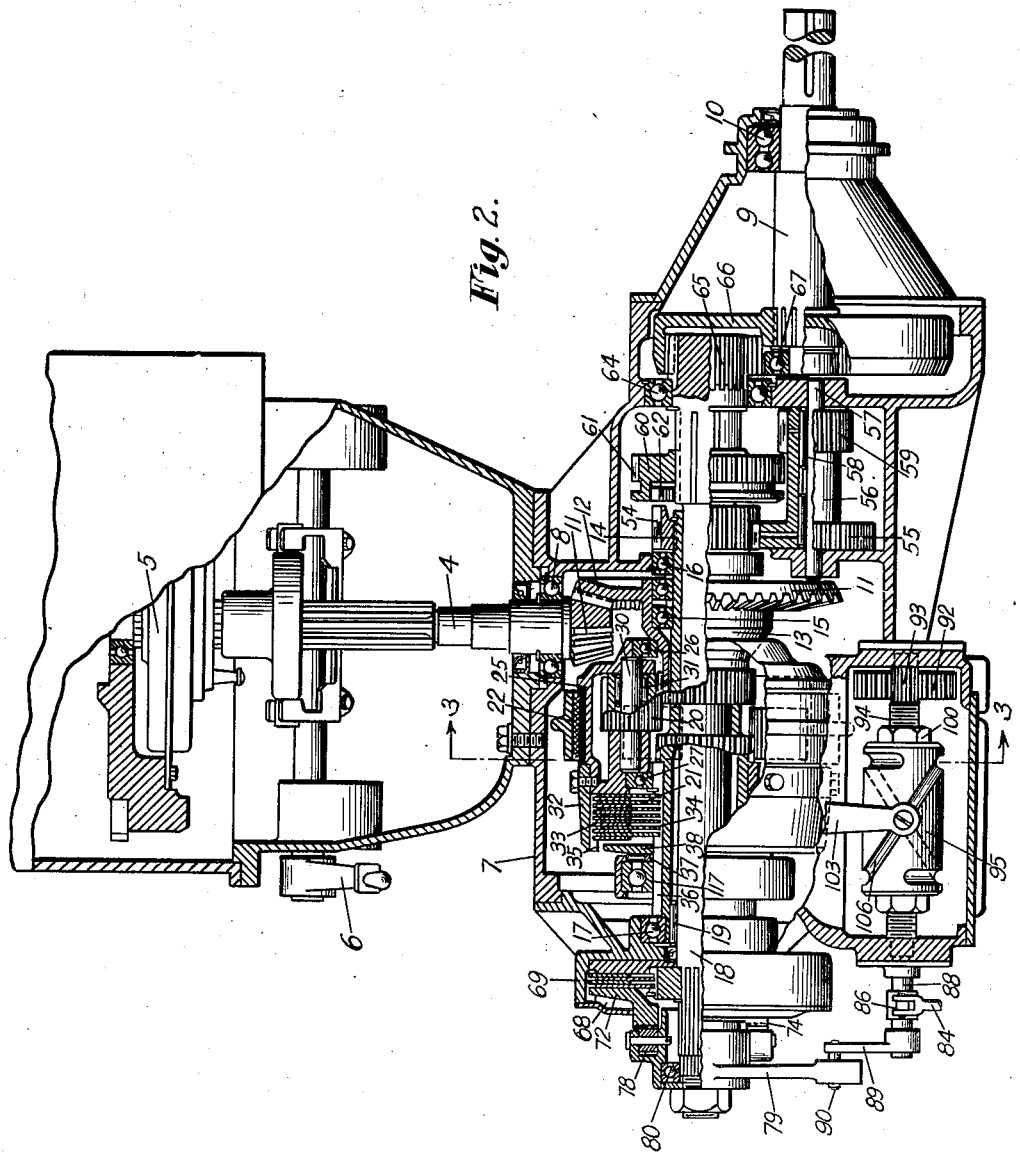
Figure 2 is a view partly in horizontal section and partly in plan of the transmission assembly shown in Figure 1.
Figure 3:
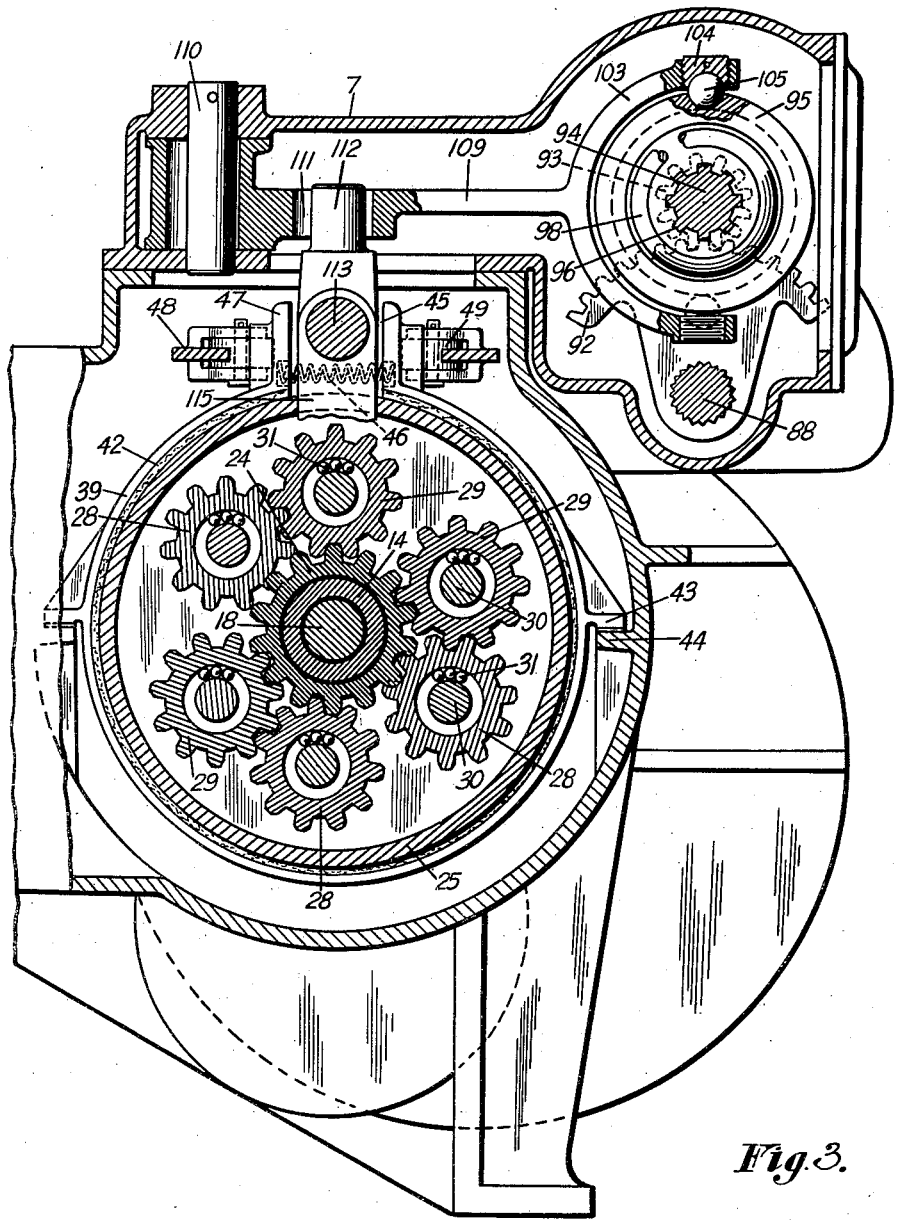
Figure 3 is a vertical section taken substantially along line 3—3 of Figure 2.
Figure 10:
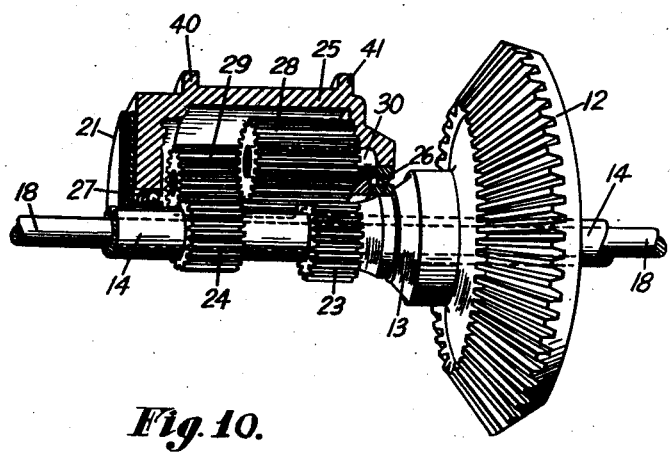
Figure 10 is a perspective view illustrating part of the planetary gearing.

The planetary gearing is illustrated best in Figures 2, 3 and 10. As shown in these figures, this gearing consists of a sun gear 23 which surrounds the shaft 14 and is integral with sleeve-like portion 13 of ring gear 12. A second sun gear 24 which is in axial alignment with the gear 23 is integral with hollow shaft 14 and is disposed at a point spaced to the left (Figures 2 and 10) from the gear 23. A cage or drum 25 which is adapted to carry the pinions that cooperate with gears 23 and 24 is mounted concentrically with the gears 23 and 24 and encloses such gears. This drum 25 is supported by a ball bearing 26 cooperating with a portion of the sleeve 13 and a ball bearing 27 cooperating with the hollow shaft 14. Thus, the drum 25 is free to rotate relative to the sleeve 13 and the gear 12 which carries it and relative to the hollow shaft 14.

The drum 25 carries on its interior three sets of cooperating pinions 28 and 29. Each pinion is rotatably carried on a stub shaft 30 (Figures 2 and 10) which is supported by the side walls of the drum 25. A roller bearing 31 (Figure 3) is preferably associated with each pinion. Thus, it will be apparent that each pinion is free to rotate about its own axis. As will be apparent from Figures 3 and 10, the pinions 28 and 29 of each set are in mesh with each other. Furthermore, as clearly shown in Figure 10, the pinion 28 of each set is in mesh with the sun gear 23 carried by sleeve 13 but is not in mesh with the sun gear 24 carried by hollow shaft 14 while the pinion 29 of each set is in mesh with the sun gear 24 carried by the shaft 14 but is not in mesh with the sun gear 23 carried by the sleeve 13.

As previously stated, a disk-type clutch 21 is provided. This clutch is adapted to be actuated to connect the drum 25 to the shaft 14 at the proper time so that they will rotate together. To form the clutch the left-hand side of the drum 25 (Figure 2) is provided with an outwardly projecting peripheral flange 32 which is rigidly secured thereto. Within this flange and in surrounding relationship to the hollow shaft 14 are a plurality of driving disks 33 and a plurality of driven disks 34 which alternate and each of which is provided with a central opening so that it may be slipped on the shaft 14. The driving disks 33 are splined to the flange 32 of drum 25 by means of a plurality of notches (not shown) formed in the periphery of the disks 33 which cooperate with a plurality of gear teeth 35 formed on the inner surface of flange 32. These driving disks 33, however, are free to rotate relatively to the hollow shaft 14. The driven disks 34 are free to rotate relative to the flange 32 but are splined to the shaft 14 by means of notches (not shown) formed in the edge of the central opening of each disk 24; these notches cooperating with a plurality of longitudinally extending teeth 36 formed on the outer surface of shaft 14. If the driving disks 33 and the driven disks 34 are forced tightly together, the drum 25 will be clutched to the shaft 14. However, if the disks are not forced together, the drum 25 can rotate relative to the shaft 14.

In order to force the disks of the clutch together, we provide a collar member 37 which is disposed on the shaft 14 and is splined thereon by means including the teeth 36 for longitudinal movement of the shaft. This collar engages at one side a disk-like portion 38 which is adapted to be moved into contact with the outermost disk of the clutch to force all of these disks into contact with each other. We provide suitable means, to be described subsequently, for moving the collar 37 longitudinally of shaft 14.

When it is desired to rotate the hollow shaft 14 in a forward direction, the clutch 21 is thrown into engagement. At this time the gear 12 will be driven by the pinion 11. The sun gear 23, the pinions 28 and 29 and the sun gear 24 will be locked together as a unit by engagement of the clutch 21. Consequently, the gear 12 will serve to rotate the drum 25 and the planetary gearing disposed therein as a unit. This will cause the hollow shaft 14 to be rotated about its own axis in a forward direction.

As previously stated, a brake 22 is also provided. This brake is adapted to be actuated to interrupt rotation of the drum 25 at the proper time and, consequently, to cause the planetary gearing to drive the shaft 14 in a reverse direction. The brake 22 embodies a split annular shoe 39 which is disposed in surrounding relationship to the drum 25 as illustrated best in Figures 2 and 3. The brake shoe is prevented from moving laterally, as indicated in Figure 10, by a shoulder 40 formed by the edge of flange 32 and by a shoulder 41 formed at the opposite edge of the drum. The brake shoe carries a brake band 42 of suitable material on its inner surface. As indicated in Figure 3, the brake shoe is provided with diametrically opposed lugs 43 which rest on lugs 44 carried by a portion of the housing 7. As indicated in Figures 3 and 5, the brake shoe 39 is split at its upper end as at 45. The brake shoe is resilient and its ends are normally spread apart by its inherent resilience and also by compression spring 46 disposed between lugs 47 formed at the ends of the shoe. Thus, the brake will normally be ineffective to stop rotation of the drum 25.

Means which may be actuated at the proper time to cause contraction of the brake shoe 39 around the drum 25 in order to prevent rotation thereof is provided. This means is illustrated best in Figures 3, 4 and 5. It comprises a yoke member 48 which carries rollers 49 on its end that engage cam portions 50 formed on the lugs 47 of the brake shoe. Each cam portion embodies a raised section 51, a downwardly inclined section 52 and a low section 53. Suitable means to be described hereinafter is provided for moving the yoke 48 laterally (Figure 5) to cause the rollers 49 to engage the cam portions 50 and to contract or expand the brake shoe. It will be apparent that when the rollers are disposed on the higher section 51 of the cam portion, the brake shoe will be contracted and the drum 25 will be prevented from rotating. When the rollers 49 are disposed on the lower sections 53 of the cam portions, the brake shoe will be expanded and the drum member 25 will be permitted to rotate.

When it is desired to rotate the hollow shaft 14 in a direction opposite to the direction it is rotated when the clutch 21 is engaged, the clutch 21 is thrown out of engagement and the brake 22 is applied. This causes the drum 25 to be held so that it cannot be rotated. At this time the pinion 11 will drive the gear 12 which will in turn rotate the sun gear 23. This will cause the pinions 28 to be rotated about their axes and which in turn will drive the pinions 29 about their axes in a reverse direction. The pinions 29 will drive the sun gear 24 and, consequently, the hollow shaft 14. The hollow shaft 14, as will be apparent, will be driven in a direction opposite to that in which it was previously driven when the drum 25 was permitted to rotate.

As will be explained hereinafter, we provide means for simultaneously engaging the clutch 21 and releasing the brake 22 and vice versa. This means is also of such a nature that both the clutch 21 and the brake 22 can be released to entirely disconnect the input shaft 4 from the hollow shaft 14.

As previously stated, the shaft 18 is disposed within the hollow shaft 14. We provide means for connecting the hollow shaft 14 and the shaft 18 together so that the shaft 18 will be driven by the shaft 14. This means embodies multi-speed gearing which may be shifted to drive the shaft 18 at different rates of speed. Thus, the right-hand end of the shaft 14 (Figure 2) is provided with a pinion 54 keyed thereto. This pinion meshes with a gear 55 of a double gear unit 56 which is rotatably mounted by means of a stub shaft 57 and roller bearings 58 on suitable supports secured to the housing 7. This double gear unit also embodies a pinion 59. The shaft 18 projects from this end of the shaft 14 and has splined thereon adjacent the pinion 54 a double gear unit 60. This double gear unit has an external gear portion 61 and an internal gear portion 62.

In order for the hollow shaft 14 to drive the shaft 18 at one rate of speed, the gear unit 60 is moved to the left so that the pinion 54 will mesh with the internal teeth 62 of the unit 60. In order to drive the shaft 18 at a different rate of speed, the gear unit 60 is moved to the right into engagement with the pinion 59 of the gear unit 56. Then the pinion 54 will drive gear 55 and unit 56, driving pinion 59 thereof which, in turn, will drive gear unit 60 and the shaft 18. When the gear unit 60 is in the position indicated in Figure 3, the shafts 14 and 18 will be entirely disconnected from each other. The gear unit 60 is moved longitudinally of the shaft 18 by means of a gear shift lever 63 which may be connected to the unit 60 in any suitable manner. Although we have described the multi-speed gear unit as being of such a nature that two different speeds may be obtained, it is to be understood that it may be modified to obtain any number of different speeds.

Thus, it will be apparent that with this arrangement the shaft 18 may be driven at selected speeds. Furthermore, it will be apparent that the multi-speed gears may be shifted independently. The gears may be shifted to drive the shaft 18 at a selected speed and the clutch 21 and brake 22 may be actuated to drive the shaft 14 in a forward or reverse direction or to entirely interrupt driving of such shaft without changing the setting of the gears.

The right-hand end (Figure 2) of the shaft 18 is supported in a ball bearing 64. This end of the shaft has a pinion 65 formed thereon. This pinion 65 meshes with a large internal gear 66. This gear 66 is keyed on the inner end of the out-put shaft 9. The inner portion of the out-put shaft 9 is supported by a ball bearing 67. Thus, it will be apparent that the out-put shaft 9 will be driven by the shaft 18. The shaft 18 is independent of the out-put shaft 9 but is continuously connected thereto by the gears 65 and 66. This is important because the main brake unit 68 is associated with the opposite end of the shaft 18.

The main brake unit 68 is adapted to exert a braking action on the out-put shaft whenever the drive between the in-put shaft and the out-put shaft is interrupted. This brake unit 68 is preferably of the friction disk type. It is illustrated best in Figures 2, 4 and 5. The end of the housing 7 has a brake housing 69 formed thereon. Within this housing and in surrounding relationship to the shaft 18 are disposed a set of disks 70 and a set of disks 71. The disks 70 and 71 alternate with each other. The disks 71 are keyed to the housing 69 in exactly the same way that the disks 33 of the clutch 21 are keyed to the member 32. The disks 70 are keyed to the shaft 18 in practically the same manner that the disks 34 of the clutch 21 are keyed to the hollow shaft 14. Thus, the disks 70 will rotate with the shaft 18 when the brake is not applied while the disks 71 will remain stationary with the housing 69. In order to force the disks 70 and 71 together when it is desired to apply the brake, a plate member 72 is disposed in surrounding relationship to the shaft 18 and adjacent the outermost disk 70. This plate 72 is provided with a hub portion 73 which has outwardly projecting cam members 74 (Figure 5) thereon. Each of these cam members has inclined cam surfaces 75 and 76 on its opposite sides and a notch 77 at the peak thereof. The cam members 74 are adapted to be engaged by small rollers 78. These rollers 78 are carried by a lever 79. The lever 79 is mounted on the end of the shaft 18 by means of a ball bearing 80. The lever 79 may be swung to such a position that each of the rollers 78 will be disposed on either the surface 75 or the surface 76 of the cooperating cam member 74. When the rollers are in either of these positions the brake 68 will be disengaged. However, when the rollers 78 are in an intermediate position such that they rest in the notches 77 of cams 74, the member 72 will be forced inwardly forcing the plates 70 and 71 tightly together and applying the brake. The means for controlling movement of the lever 79 will be described hereinafter.

It will be noted that the main brake unit 68 is associated with the shaft 18. Since this shaft is independent of the out-put shaft 9 and is connected to the out-put shaft by speed-reducing gearing, more effective braking action will be obtained on the shaft 9 than if the brake were associated directly with the shaft 9. The shaft 18 is continuously connected to the shaft 9 through gears 65 and 66. Thus, the brake is continuously connected to the out-put shaft, regardless of whether sliding gear unit 60 is in a neutral position or in mesh with pinion 54 or pinion 59. The brake is always connected to the out-put shaft by means of speed-reducing gearing 65 and 66 which makes it possible for the brake to apply more torque to the shaft 9 and, therefore, to obtain a more effective braking action.

We will now describe the controlling means which we provide for the transmission. As previously indicated, this controlling means is of such a nature that by merely operating a single control lever, the brake unit 68, the clutch 21 and the brake member 22 will all be operative. This means is of such a nature that whenever the drive between the in-put shaft 4 and the out-put shaft 9 is interrupted, the brake 68 will be automatically applied. Furthermore, it is of such a nature that when the main control lever is moved in one direction from neutral, the brake 68 will be released, the clutch 21 engaged and the brake 22 released. When the main control lever is moved in the opposite direction from neutral, the brake 68 will be released, the clutch 21 disengaged and the brake 22 applied. When the control lever is in neutral position the brake 68 is always applied.

The main control lever is indicated by the numeral 81 (Figure 1). The lower end of this lever 81 is keyed to a shaft 82 which is rotatably mounted in supports 83. Intermediate its upper and lower ends the lever 81 is pivoted to a link 84 as at 85. The opposite end of this link 84 is pivoted at 86 to the upper end of a lever 87. This lever has its lower end keyed to a shaft 88 which is suitably supported for rotation. One end of this shaft 88 has a lever 89 keyed thereon. The free end of this lever is provided with a pin 90 which fits through a slot 91 formed in the outer end of the arm 79 which operates brake 68. When the lever 81 is in neutral position, as indicated in Figure 1, the arm 79 will be in such a position that the rollers 78 carried thereby will be in the notches 77 of cams 74 so that the brake will be applied. However, when the main control lever is moved in either direction away from neutral, the arm 79 will be swung to such a position that the rollers 78 carried thereby will be either on the surfaces 75 or the surfaces 76 of the cams 74 and the brake will be released.

At its opposite end the shaft 88 carries a gear segment 92 which is keyed thereon. This upstanding segment 92 meshes with a pinion 93 which is integral with or keyed on the end of a shaft 94. This shaft 94 is disposed within the housing 7 and is rotatably mounted in ball bearings 95a (Figure 5) carried by the housing. The shaft 94 is disposed directly above the shaft 88 in alignment therewith and extends substantially parallel to the shaft 88. The shaft 94 carries a sleeve or cylindrical member 95 that is adapted to rotate therewith. This member 95 is splined to a portion 96 of the shaft 94 so that it can move longitudinally of the shaft. A socket 97 is formed in each end of the member 95 and receives a compression spring 98. The inner end of each spring bears against the end wall 99 of the socket. The outer end of the spring bears against a collar 100 which is threaded onto a threaded portion 101 of the shaft and which is locked in position by a setscrew 102. The collar 100 is of slightly less diameter than the socket 97 so that it may move into the socket when necessary.

Figure 6:
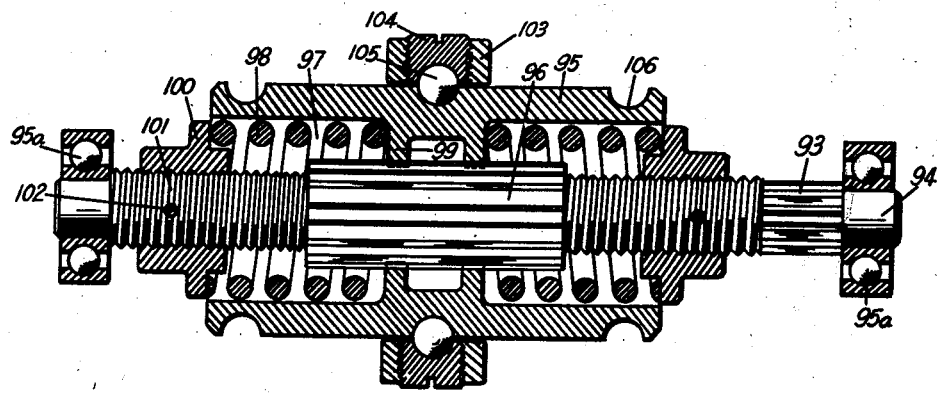
Figure 6 is a section taken through a unit forming part of the controlling means which actuates the clutch and brake which control the planetary gearing to cause rotation of the out-put shaft in opposite directions.

A fork or yoke member 103 is disposed in cooperative relationship to the member 95. This fork is connected to the member 95 in such a manner that when the member 95 is rotated, the fork will be swung from one side to the other of the neutral position indicated in Figures 1 and 6 and longitudinally of shaft 94. As indicated best in Figure 6, ball socket members 104 are threaded through the opposite arms of the fork 103. Each member 104 has a socket formed in its inner end which receives a ball 105. These balls 105 are adapted to project into a pair of grooves 106 formed in the periphery of the member 95. Each ball 105 is adapted to coöperate with one of the grooves 106.

The member 95 in reality serves as a screw member which when rotated will swing the fork 103 from side to side. Each of the grooves 106 passes around the member 95 in a substantially helical path. The path each of the grooves follows is illustrated in the diagrammatic view of Figure 10 which is a flat lay-out of the surface of the member 95. It will be noted in this view that while the main portion 107 of each groove extends helically around member 95, each end portion 108 of each groove is straight being substantially at right angles to the longitudinal axis of member 95.

It will be apparent that when the main control lever is moved in either direction away from neutral position, the gear segment 92 will be swung to one side or the other rotating pinion 93. This will rotate shaft 94 and consequently member 95. Rotation of member 95 will shift the fork 103 along the axis of the shaft 94. The springs 98 are provided as cushioning elements to permit limited longitudinal movement of the member 95 relative to the shaft 94 so as to eliminate any danger of binding of parts or injury to the parts which this mechanism controls and to provide an automatic wear take-up adjustment for clutch 21 and brake 22.

The fork 103 is carried on one end of a lever 109 (Figures 1 and 5) which is pivoted to the housing as at 110, by a pin-and-slot connection, for movement in a horizontal plane. Intermediate its ends this lever 109 is provided with a slot 111 which receives an upstanding pin 112. This upstanding pin 112 is carried by the yoke member 48 which controls brake 22. The yoke 48 is carried by a pin 113 which has its ends disposed in sockets 114 suitably supported by the housing. The pin 113 is free to move longitudinally of itself in the sockets 114. Movement of the fork 103, consequently, causes movement of the lever 109 about its pivot 110. This will in turn cause longitudinal movement of the pin 113 and the yoke 48 carried thereby which controls contraction and expansion of the brake shoe 39 of the brake 22. The yoke member 48 has formed integral therewith (Figure 4) a depending yoke member 115. This yoke member 115 engages the collar member 37 which controls the clutch 21. A ball bearing 116 is included in the connection between the yoke 115 and a collar 117, which engages collar 37, to permit rotation of the collar relative to the yoke. Thus, it will be apparent that upon movement of the brake-controlling yoke 48, the clutch-controlling yoke 115 is also moved. The yokes 48 and 115, which are integral, are so arranged relative to each other that when the yoke 115 is in position to engage the clutch 21, the yoke 48 will be in such a position as to release the brake 22. When the yoke 48 is in position to apply the brake 22, the yoke 115 will be in a position to disengage the clutch 21.

Figures 7, 8:
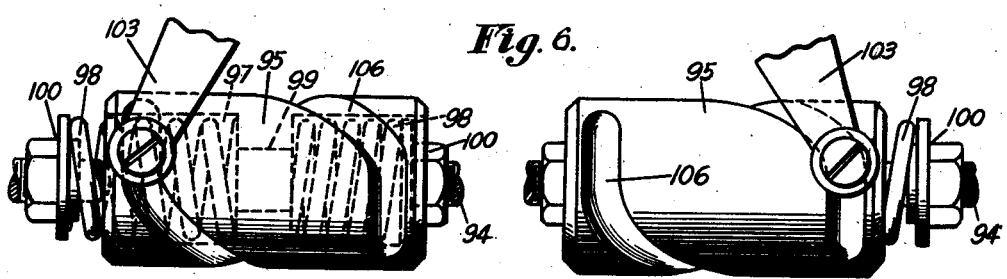
Figure 7 is a plan view of the unit illustrated in Figure 6 showing such unit adjusted to one position to cause rotation of the out-put shaft in one direction.
Figure 8 is a similar view showing the unit adjusted to a different position such that the out-put shaft will be driven in an opposite direction.
Figure 9:
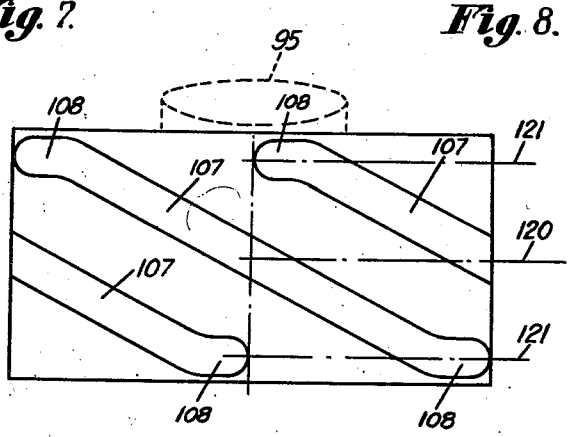
Figure 9 is a diagrammatic view illustrating the shape of the grooves which are provided in the cylindrical member shown in Figure 6.

The neutral position in the grooves 107 is indicated by line 120 in Figure 9. The brake applying and clutch engaging positions are indicated by the lines 121. When the yoke 103 is moved to the left by rotation of member 95, this causes the brake 22 to be applied. The brake will be engaged before the balls 105 pass into the portions 108 of grooves 107. However, continued rotation of member 95 will cause it to move to the right (Figure 7) on shaft 96 causing the spring 98 to the right to be compressed and the spring 98 to the left to be expanded. The balls 105 will finally move into portions 108 of grooves 107. Then the brake will be held in applied position with a resilient pressure. This resilient pressure will serve to take up any wear of the brake-band. When brake 22 is applied, the clutch 21 is released, and vice versa. The springs will also compensate for wear of the clutch. When the yoke 103 is moved into the position indicated in Figure 8, the clutch 21 is engaged and brake 22 is released. At this time the spring 98 to the right will be expanded and the spring 98 to the left will be compressed.

It will be apparent that with these controls, when the main control lever is moved in either direction away from neutral, the brake 68 will be released. While the main control lever is in neutral, the brake 68 will be applied. Also, movement of the main control lever away from neutral in one direction will cause the clutch 21 to be engaged and the brake 22 to be released. Movement of the main control lever in the opposite direction from neutral will cause the clutch 21 to be disengaged and the brake 22 to be applied. When the main control lever is in neutral position both the clutch 21 and the brake 22 will be released.

The controlling means for the forward and reversing means of the transmission and for the main brake unit are all under the control of a single control lever. The controlling means for the various units are simple and composed of a small number of parts being free of excessive friction to insure ease of operation and being of such a nature that the parts will not bind.

Various other advantages will be apparent from the preceding description, the drawings and the following claim.

Having thus described our invention, what we claim is:

In a device of the type described, an actuating member adapted to be moved in opposite directions, means for moving said actuating member, said means comprising a rotatably mounted shaft, a sleeve splined on said shaft, means for normally maintaining said sleeve in a predetermined position on said shaft comprising a pair of compression springs disposed around said shaft and opposing each other, each of said springs having its inner end engaging said sleeve and its outer end engaging a collar longitudinally adjustable on said shaft, said actuating member having portions which interfit with helical grooves formed in said sleeves so that rotation of said shaft and sleeve will move said actuating member longitudinally of said sleeve in either direction depending upon the direction of rotation of said shaft, said springs permitting limited movement of said sleeve on said shaft for causing a resilient pressure to be exerted on said actuating member after it has been moved to its final position in either direction.

GEBHARD JAEGER.
CHRIS GERST.